Dec. 30, 1958     H. NIEDEROEST     2,866,511
SAFETY BRAKE
Filed Aug. 6, 1956     2 Sheets-Sheet 1
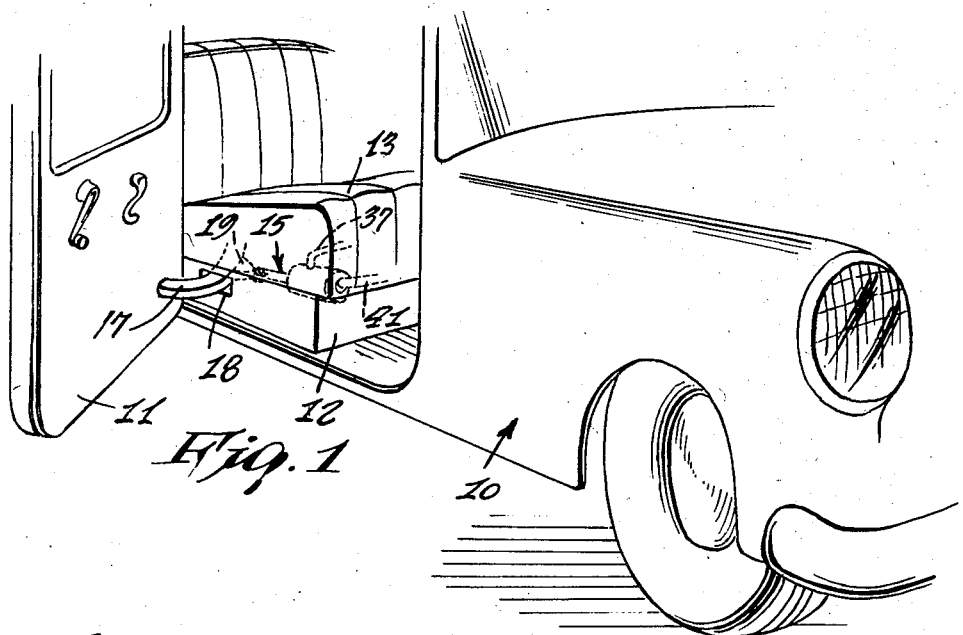
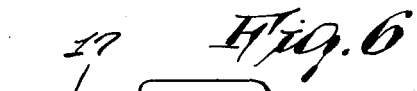
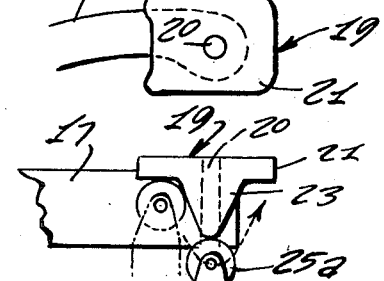
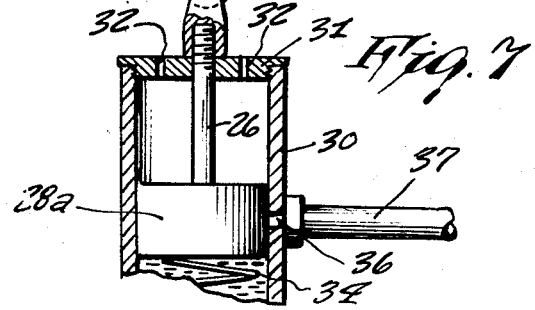
INVENTOR.
HENRY NIEDEROEST
BY Carl Miller
ATTORNEY Dec. 30, 1958
H. NIEDEROEST
2,866,511
SAFETY BRAKE
Filed Aug. 6, 1956
2 Sheets-Sheet 2
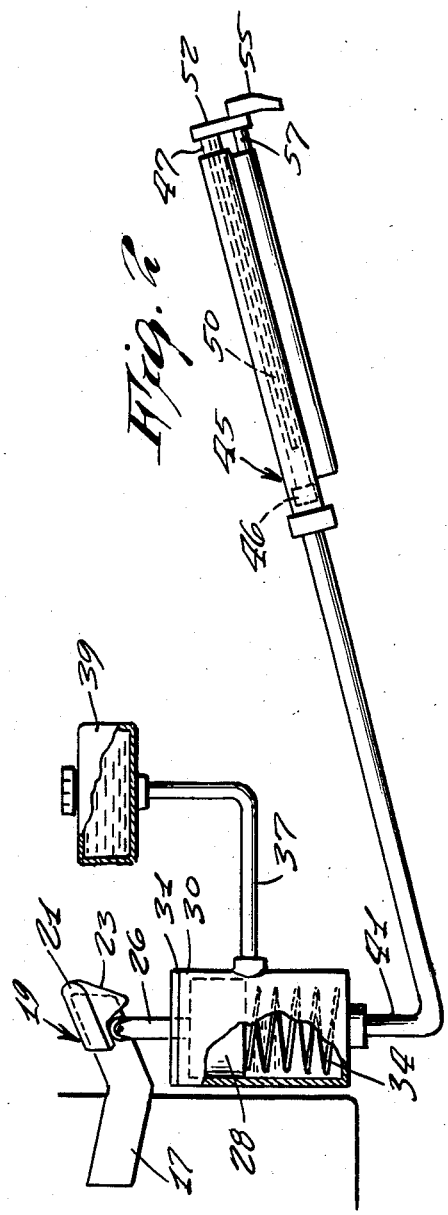
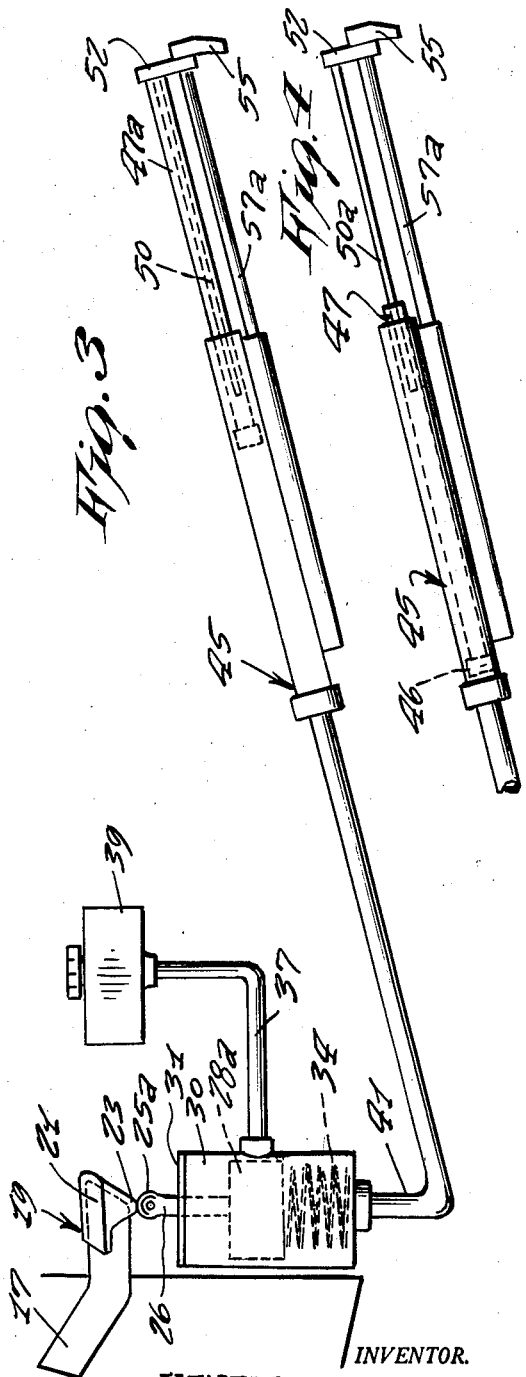
INVENTOR.
HENRY NIEDEROEST
BY
Carl Miller
ATTORNEY

United States Patent Office

2,866,511
Patented Dec. 30, 1958

2,866,511

SAFETY BRAKE

Henry Niederoest, Metuchen, N. J.

Application August 6, 1956, Serial No. 602,146

3 Claims. (Cl. 180—82)

This invention relates to safety brakes for automotive vehicles and, more particularly, to safety brakes that are adapted to be actuated in response to the opening of a vehicle door.

Ordinarily, the doors of vehicles should not be opened while the vehicle is in motion. However, the doors are some times accidently opened or, in case of emergency, purposely opened while the vehicle is moving. When this occurs, the driver and passengers in the vehicle are in great danger of being thrown out of the vehicle and injured. Furthermore, while the hand brake of the vehicle should usually be applied before leaving a standing vehicle, the operator thereof frequently forgets or otherwise neglects to do so. An object of this invention, therefore, is to provide an automatic brake device for automotive vehicles that is simple in construction, efficient in operation, and which is adapted to be automatically energized upon the opening of a door of an automotive vehicle when the vehicle is in motion or at a standstill.

Another object of this invention, is to provide a hydraulic safety brake for automotive vehicles that is adapted to apply the hand brake of the vehicle in response to the opening of a door thereof and which is not dependent upon an outside source of energy for its operation.

All of the foregoing and still further objects and advantages of this invention will become apparent from a study of the following specification, taken in connection with the accompanying drawing, wherein:

Figure 1 is a perspective view of a vehicle provided with a safety brake made in accordance with this invention;

Figure 2 is a schematic diagram showing the positions of the related parts of the safety brake when the vehicle door is in a closed position;

Figure 3 is a view similar to Figure 2, showing the relationship of the parts when the door is in a partially opened position;

Figure 4 is a fragmentary view similar to Figure 3 showing the position of the vehicle hand brake when the vehicle is in a fully opened position;

Figure 5 is an enlarged cross-sectional view showing the interior construction of the safety brake actuating cylinder and piston assembly;

Figure 6 is a plan view of the door actuated trigger disc;

Figure 7 is an enlarged plan view, partly in section, showing the engagement of the trigger disc with the follower means of a fluid supply cylinder; and Figure 8 is a plan view of the fluid supply cylinder shown in Figure 7.

Referring now to Figure 1 of the drawing, an automobile 10 is shown having a safety brake assembly 15 disposed in the base 12 of a car seat 13 and immediately adjacent to a door 11 thereof. It is to be understood, that this safety brake assembly may be arranged for use with any or all of the doors of the vehicle, the door opposite from the driver being shown for purposes of illustration in the drawing. Also, the door 11 may be of the type that is hinged on the center post as shown in the drawing or of the more conventional type in which it is hinged on the front post of the side of the vehicle. A control arm 17 is carried by the base of the door 11 adjacent to the hinge thereof and is received within an opening 18 in the base 12 of the seat, and has a trigger device 19 supported at its free end. Referring to Figures 6 and 7, the trigger device 19 is shown to include a flat back plate 21 having a wedge-shaped cam 23 disposed at its opposite side and connected to the control arm 17 by means of a pivot pin 20.

The cam 23 is adapted to engage with a roller-type follower 25 carried at the outer end of a piston rod 26 that is connected at its inner end to a reciprocating piston 28. The piston 28 is disposed within a closed fluid actuating cylinder 30 having an outer end wall 31 provided with a plurality of air vents 32 for communicating with atmosphere. The inner end wall of the cylinder supports a compression spring 34 that reacts at its opposite end with the piston 28. A port 36 disposed between the inner and outer end walls communicates with a supply line 37 that is adapted to supply the interior of the cylinder 30 with hydraulic fluid from a storage tank 39. The bottom wall of the cylinder has a port that communicates with a delivery line 41 that is in communication at its opposite end with the interior of an operating cylinder 45. As more clearly shown in Figure 5, the cylinder 45 contains a piston 46 having a rod 47 connected thereto and extending outwardly from the open end 48 of the cylinder. The piston rod 47 has a longitudinally extending bore 49 therein, within which a piston connector shaft 50 is slidably disposed for reciprocating longitudinal movement. The outer end of the shaft 50 is provided with an attachment plate 52 that is adapted to engage the hande 55 of a hand brake operator shaft 57.

In operation, with the door 11 in a closed position, all of the related parts assume the position shown in Figure 2. Upon moving the door towards an open position, the cam 23 is adapted to move the piston 28 of the actuating cylinder inwardly to an operating position 28a as more clearly shown in Figure 3, to force the supply of fluid at the bottom of the cylinder 30 through the delivery line 41 and into the cylinder 45 which, in turn, effects the outward movement of the operating piston rod 47 to an outermost position 47a. The outward movement of the piston rod 47 also carries the handle and operator shaft 57 of the brake assembly outwardly so as to automatically effect engagement of the hand brake assembly, as clearly shown in Figure 3. Continued opening movement of the door 11 causes the follower 25a to move along the opposite side of the crest of the cam 23, whereupon the piston 28a is adapted to return to its normal position 28 so as to withdraw the fluid from the operating cylinder 45 back to the actuating cylinder 30. This causes an inward movement of the operating piston 46 and piston rod 47a but since the connector shaft 50 is slidably disposed within the rod 47, it remains in its extended position with the handle of the hand brake, as shown in Figure 4. Therefore, release of the hand brake can only be effected manually by releasing the handle 55, whereupon the inward movement of the operator shaft 57 also returns the connector shaft 50 to its inward position, as shown in Figure 2. It will, therefore, be recognized that once the door is opened, the hand brake operator shaft 57 is moved to its engaged position 57a, as shown in Figures 3 and 4, after which it can only be returned to its normal disengaged position by manually releasing the handle 55 thereof.

While this invention has been described with particular reference to the specific form shown in the drawing, it is to be understood that such is not to be construed as

Having thus described my invention, I claim as new and desire to secure by Letters Patent:

1. A safety device for automotive vehicles having a normally retracted and disengaged manually operable hand brake and at least one door pivotally arranged for movement between a normally closed and an open position in which the hand brake has means for holding and retaining it in an engaged position, fluid pressure means comprising an actuating cylinder and an operating cylinder in communication with each other, said operating cylinder having piston means associated with the handle of said vehicle hand brake to move said hand brake into an engaging position in response to pressure initiated therein by said actuating cylinder, and a control arm carried by said door to urge said piston means of said actuating cylinder into a fluid pressure transmitting position when said door is moved towards an open position to effect movement of said operating cylinder piston means and said associated hand brake to said engaging position, wherein said actuating cylinder comprises a longitudinally reciprocating piston, a pressure fluid supply line communicating at one end with a supply of pressure fluid and at the opposite end with the interior of said actuating cylinder between opposite extremities thereof, a pressure fluid delivery line communicating with said operating cylinder and with the interior of one extremity of said actuating cylinder, an end wall having vent means to atmosphere disposed at the opposite extremity of said actuating cylinder, said piston having a rod extending outwardly through said end wall, follower means carried by said outwardly extending piston rod in operating engagement with said control arm and adapted to move said piston from a normally disposed position between said end wall and said supply line to a pressure transmitting position between said supply line and said delivery line, said movement therebetween being operative to transmit fluid pressure through said delivery line to said operating cylinder.

2. A safety device as set forth in claim 1, wherein said operating cylinder comprises a substantially elongated cylinder open at one outer extremity and communicating with said delivery line at an opposite extremity, a piston including an elongated piston rod disposed within said elongated cylinder and adapted to be moved from a normally retracted position to an outwardly extended position therein by the movement of said actuating piston to said pressure transmitting position, said piston rod having a connector shaft including a hand brake handle attachment plate slidably disposed therein for movement therewith to an extended position to move said hand brake into said engaged position, said operating piston being adapted to be withdrawn into said retracted position by the return movement of said actuating piston to said normally disposed position independently of said connector shaft, whereby said hand brake once having been engaged by said actuating cylinder is maintained in said engaged position by said hand brake holding means independently of the movement of said door and associated control arm until manually released.

3. A safety device as set forth in claim 2, wherein said follower means comprises a roller and said control arm comprises a wedge-shaped cam surface having a single crest, said roller being adapted to be moved from engagement with one side of said crest when the vehicle door is closed into engagement with said crest when said door is partially opened, and into engagement with the other side of said crest when said door is fully opened.

References Cited in the file of this patent

UNITED STATES PATENTS

| 1,580,722 | Greathouse | Apr. 13, 1926 |
| 2,626,003 | Kutzer | Jan. 20, 1953 |
| 2,750,010 | Day | June 12, 1956 |

FOREIGN PATENTS

| 374,251 | Great Britain | June 9, 1932 |